United States Patent [19]

Just et al.

[11] E Re. 29,374

[45] Reissued Aug. 30, 1977

[54] SOLID STATE IGNITION CIRCUITRY

[75] Inventors: Franklin H. Just; Brent L. Powell; John A. Waters, all of Idaho Falls, Idaho

[73] Assignees: Franklin H. Just; John A. Waters, both of Idaho Falls, Idaho

[21] Appl. No.: 620,147

[22] Filed: Oct. 6, 1975

Related U.S. Patent Documents

Reissue of:

[64] Patent No.: 3,851,636
Issued: Dec. 3, 1974
Appl. No.: 402,010
Filed: Oct. 1, 1973

[51] Int. Cl.[2] ..... F02P 3/06

[52] U.S. Cl. ..... 123/148 CC; 315/209 SC

[58] Field of Search ..... 123/148 E, 148 CC, 149 R, 123/149 A, 149 D; 315/209 CD, 209 SC

[56] References Cited

U.S. PATENT DOCUMENTS

| | | | |
|---|---|---|---|
| 3,242,420 | 3/1966 | Ulrey | 123/148 E X |
| 3,260,251 | 7/1966 | Lange | 315/209 SC X |
| 3,331,362 | 7/1967 | Mitchell | 123/148 E |
| 3,363,198 | 1/1968 | Davies | 123/148 E X |
| 3,512,042 | 5/1970 | Malavasi et al. | 123/148 E X |
| 3,703,889 | 11/1972 | Bodig et al. | 123/148 E |
| 3,855,985 | 12/1974 | Shirai | 123/148 CC |
| 3,941,110 | 3/1976 | Sekiguchi | 123/148 CC |

FOREIGN PATENT DOCUMENTS

| | | | |
|---|---|---|---|
| 1,539,257 | 10/1969 | Germany | 123/148 CC |
| 2,263,244 | 7/1973 | Germany | 123/148 CC |

*Primary Examiner*—Carroll B. Dority, Jr.
*Assistant Examiner*—Tony M. Argenbright
*Attorney, Agent, or Firm*—Mallinckrodt & Mallinckrodt

[57] ABSTRACT

Solid state ignition circuitry for transmitting impulse voltages, produced by [a] magneto *means* associated with an internal combustion engine, to a transformer, which, in turn, generates a high voltage impulse to produce sparks in the spark plugs of the engine. The circuitry includes two silicon controlled rectifiers adapted to control the discharge of a capacitor through the transformer. The capacitor charges during one part of a given time period, e.g., the positive half cycle of alternating current produced by the magneto, and the silicon controlled rectifiers are adapted to discharge the capacitor during the other part of such time period, e.g., the negative half cycle of such current. The particular instant at which the capacitor discharges can be varied by *adjustable* means *for applying controlled input voltages to the control electrodes of* [of a potentiometer, which is associated with] the silicon controlled rectifiers. Thus, the timing of the ignition sparks generated in the spark plugs can [thus] be set by adjusting the [potentiometer] *time at which the capacitor discharges.*

10 Claims, 2 Drawing Figures

SOLID STATE IGNITION CIRCUITRY

Matter enclosed in heavy brackets [ ] appears in the original patent but forms no part of this reissue specification; matter printed in italics indicates the additions made by reissue.

BACKGROUND OF THE INVENTION

1. Field

This invention is concerned with magneto-type ignition systems for internal combustion engines.

2. State of the Art

Many types of ignition circuits have been developed for supplying high voltage discharges to ignite a combustible mixture within the cylinders of an internal combustion engine. Examples of various ignition circuits utilizing solid state components are shown in U.S. Pat. Nos. 3,184,653; 3,260,251; 3,316,449; 3,331,362; 3,358,665; 3,372,684; 3,405,347; and 3,512,042.

SUMMARY OF THE INVENTION

Magneto ignition systems are widely used with internal combustion engines. The present invention provides novel ignition circuitry for controlling the transmission of cyclic current pulses from [a] magneto *means* to a transformer, which, in turn generates high voltage impulses to produce sparks in the spark plugs of the engine. Such ignition control circuitry comprises solid state control devices, which are reliable and stable irrespective of environmental conditions or wear. The ignition system has no contacts, breakers or other moving parts, except the rotating member of the magneto *means*. Setting of the timing of the system is adjustable.

In the circuitry, [an] input conductor [is] *means are* adapted to receive voltage impulses from the magneto *means*. An electrical circuit is connected to the input conductor *means* and comprises, in series, a diode rectifier, a storage capacitor, and an output conductor, the latter being adapted for connection to the primary winding of a transformer. During the [positive portion of] *cyclic time intervals in which positive voltages are produced by* the magneto [cycle] *means*, current flows through the diode rectifier of the circuit, thereby charging the storage capacitor.

A second electrical circuit comprises a silicon controlled rectifier (SCR) connected between ground and that portion of the first circuit between the diode and the storage capacitor. The SCR is maintained in its nonconducting state during the *cyclic time intervals in which* positive [portion of] *voltages are produced by* the magneto [cycle] *means* and is rendered conductive at a preset instant during the *cyclic time intervals in which* negative [portion] *voltages are produced by the magneto means.* The storage capacitor discharges instantaneously through the silicon controlled rectifier when such rectifier is rendered conductive. The instantaneous discharge of the capacitor produces a simultaneous pulse of current, which is transmitted to the transformer by the output conductor.

Triggering of the SCR in the second circuit is controlled by a third circuit, which comprises, a diode rectifier and a silicon controlled rectifier connected in series between the input conductor and ground. [A] *Means are provided in conjunction with said magneto means, for applying controlled input voltages to the control electrode of the silicon controlled electrode in the third circuit. In a preferred embodiment, such means comprises a* potentiometer *which* shunts the silicon controlled rectifier of [this] *the* third circuit, *with* the variable contact arm of the potentiometer being connected to the control electrode of such rectifier. The third circuit also includes a capacitor and a resistor connected in series between the cathode of the silicon controlled rectifier and ground.

The control electrode of the SCR in the second circuit is connected to the third circuit between the capacitor and resistor thereof. During the negative portion of the magneto cycle, current flows through the diode of the third circuit and charges the capacitor thereof, while simultaneously developing an increasing voltage in the variable contact arm of the potentiometer. This voltage is applied to the control electrode of the SCR of that circuit. As this voltage increases, the trigger voltage of the SCR is ultimately attained, thereby rendering such rectifier conductive. The capacitor in the third circuit then instantaneously discharges through the SCR, while simultaneously producing a voltage impulse. This is applied to the control electrode of the SCR in the second circuit. The voltage impulse produced by the instantaneous discharge of the capacitor in the third circuit triggers the SCR of the second circuit.

The particular instant during the negative portion of the magneto cycle when the SCR of the second circuit is triggered can be varied and controlled by adjusting the potentiometer in the third circuit.

THE DRAWINGS

A specific embodiment, presently contemplated as the best mode of carrying out the invention, is shown in the accompanying drawings in which:

FIG. 1 is a circuit diagram of one embodiment of the invention including a magneto, a transformer, and a spark plug of a single cylinder internal combustion engine; and FIG. 2 is a series of curves illustrating some of the voltages which exist in the circuitry of FIG. 1 during its operation.

DETAILED DESCRIPTION OF THE ILLUSTRATED EMBODIMENT

Figure 1:
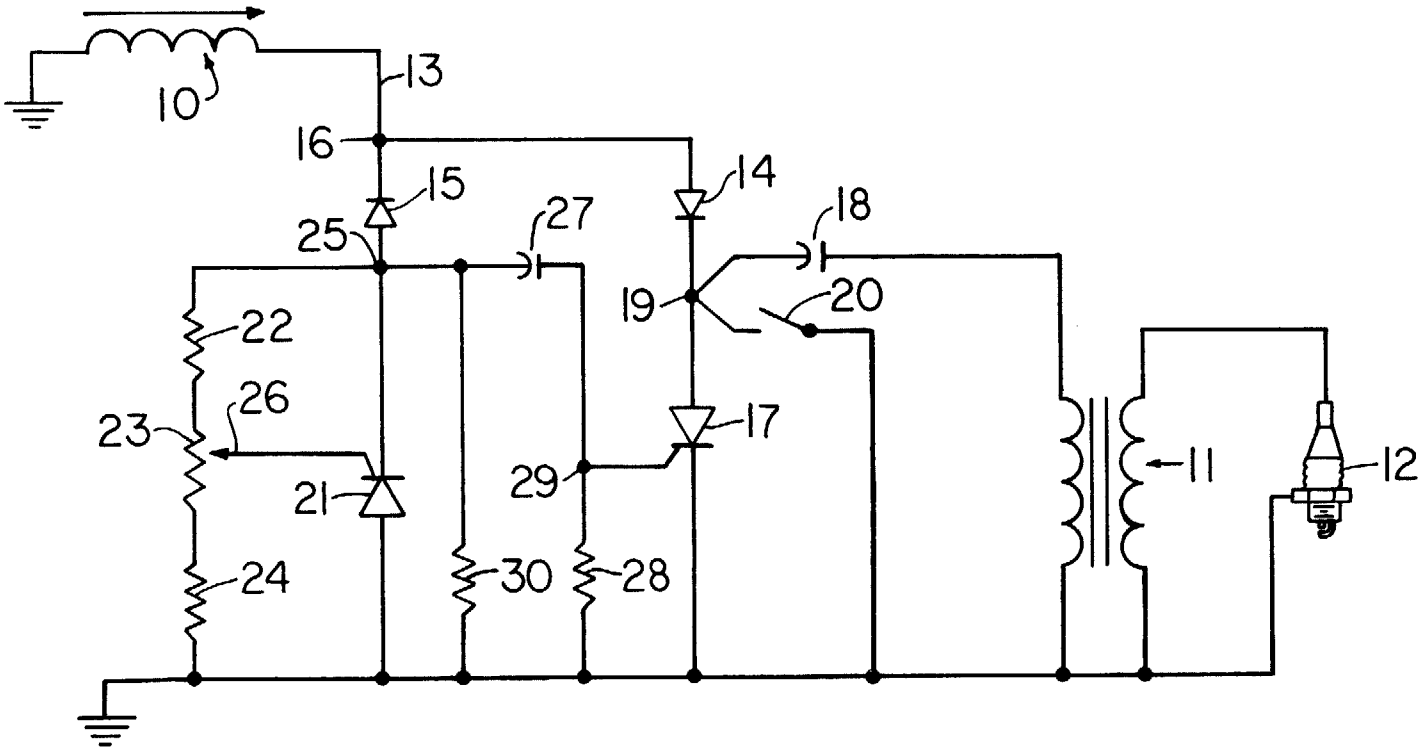

The circuitry of the invention is shown diagrammatically in FIG. 1 in combination with a magneto 10, transformer 11 and the spark plug 12 of a single cylinder internal combustion engine. Magneto 10 can be of the type having magnet pole pieces mounted in either a rotor or a flywheel. The winding of magneto 10 is connected to input conductor 13. Diodes 14 and 15 are connected in parallel to junction 16, with the cathode of diode 15 being connected to junction 16 and the anode of diode 14 being connected to junction 16.

The anode of silicon controlled rectifier 17 is connected to the cathode of diode 14 and the cathode of silicon controlled rectifier 17 is connected to ground. One side of a capacitor 18 is connected to a junction 19 intermediate the diode 14 and the silicon controlled rectifier 17, with the other side of capacitor 18 being connected to ground through the primary winding of transformer 11. A normally open switch 20 is connected from junction 19 in parallel with capacitor 18 and the primary winding of transformer 11 to ground.

A second silicon controlled rectifier 21 is connected between diode 15 and ground with the anode and cathode thereof being connected to ground and the anode of diode 15 respectively. A resistor 22, potentiometer 23 and second resistor 24 are connected in series between ground and a junction 25 which is intermediate the silicon controlled rectifier 21 and diode 15. The variable contact arm 26 of potentiometer 23 is connected to the control electrode (gate) of silicon controlled rectifier 21. A single wide-range potentiometer can be used in place of the series connection of resistor 22, potentiometer 23 and resistor 24; however, the use of the three components in series has been found preferable to the use of a single wide-range potentiometer. A capacitor 27 and a resistor 28 are also connected in series between ground and junction 25. The control electrode of silicon controlled rectifier 17 is connected to junction 29 which is intermediate capacitor 27 and resistor 28. Another resistor 30 is connected between junction 25 and ground in parallel with capacitor 27 and resistor 28.

To more fully understand the operation of the circuitry depicted in FIG. 1, a description will be given that includes specific values of all circuit components, although other suitable values of these components may be used without departing from the scope of the invention. The following values of the circuitry components depicted in FIG. 1 are known to give optimum results for use in a magneto system for internal combustion engines having up to four cylinders. Applicable silicon controlled rectifier 17 and 21 are PNPN gate control switches produced by, among others, Texas Instruments, Inc., Westinghouse Electric Corporation and Transitron Electronic Sales Corporation. Preferred silicon controlled rectifiers are those marketed under the trade name TIC 106C by Texas Instruments, Inc. and equivalent devices produced by other semiconductor manufacturers. Diodes 14 and 15 should have characteristics of low forward resistance and a high breakdown voltage. Preferred diodes are silicon diodes marketed under the designation IN4003. Resistors 22 and 28 each have a resistance of 47 ohms, resistor 24 has resistance of 2000 ohms and resistor 30 has a resistance of 200 ohms. The potentiometer 23 has a resistance of 250 ohms. Capacitor 18 has a capacitance of 2.2 micro farads, and capacitor 27 has a capacitance of 0.039 micro farad. The capacitors and resistors preferably are capable of operating at voltages of up to 200 volts.

Figure 2:
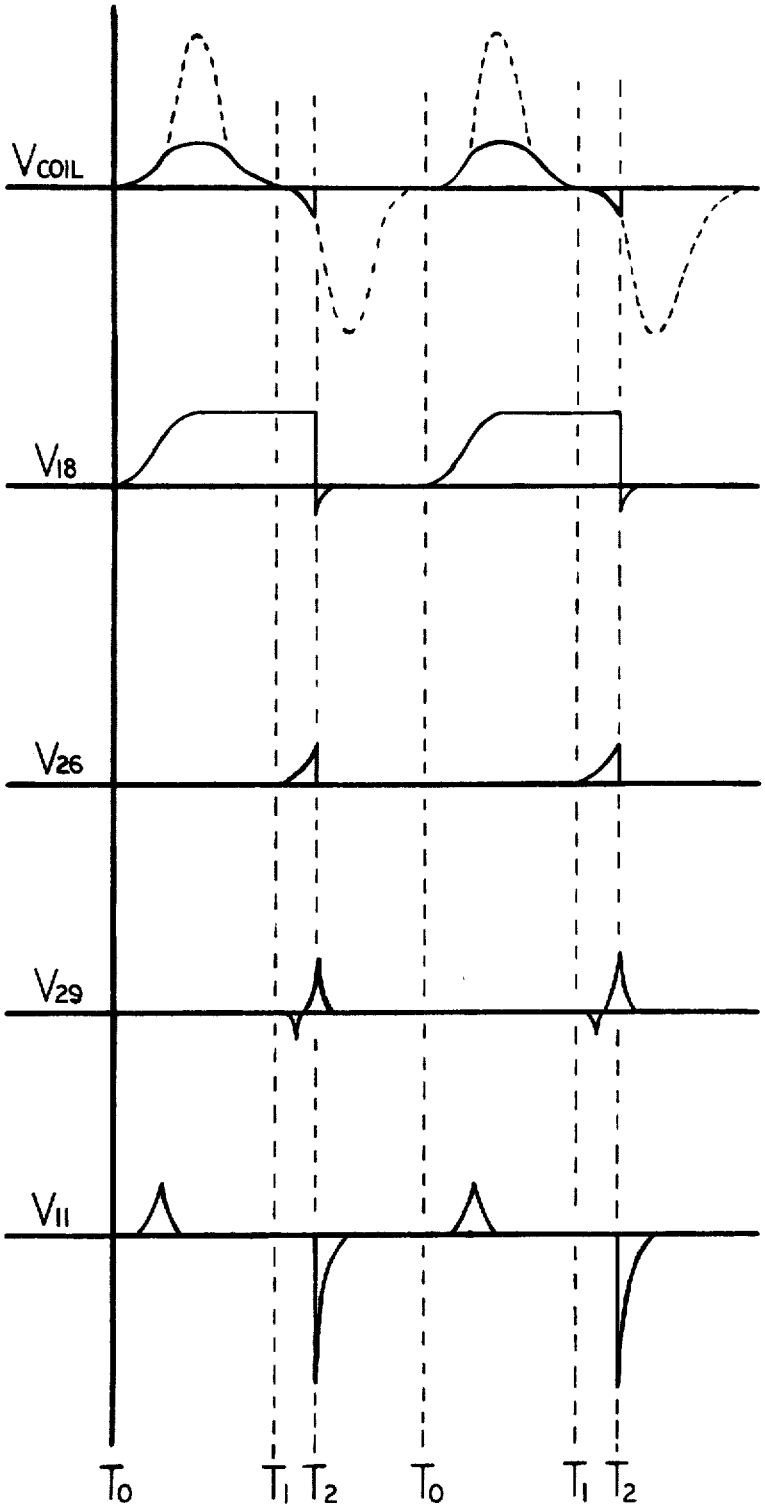

In the operation of the ignition system depicted in FIG. 1, the magneto generates alternating positive and negative voltage impulses which are applied to the input conductor 13. During the positive portion of the magneto cycle, shown between points $T_0$ and $T_1$ in FIG. 2, current flows through diode 14, capacitor 18 and the primary winding of spark plug transformer 11 thereby charging capacitor 18. During this portion of the magneto cycle, no current flows through diode 15 or silicon controlled rectifier 17. Switch 20 is normally open, and thus, current does not flow therethrough. The small current which flows through the primary winding of spark plug transformer 11 during the positive cycle produces a small voltage impulse in the secondary windings thereof; however, as shown in FIG. 2, the voltage wave form $V_{18}$ across capacitor 18 during the positive portion of the magneto cycle is sufficiently gradual so that the corresponding voltage $V_{11}$ produced in the primary winding of transformer 11 is insufficient to produce a voltage impulse from the secondary windings of transformer 11 capable of producing a spark across the electrodes of spark plug 12. The voltage $V_{18}$ across capacitor 18 and the primary winding of transformer 11 builds up to a steady value during the positive portion of the magneto cycle and remains constant during the latter state of the positive portion and the initial stage of the negative portion of the magneto cycle as shown between points $T_1$ and $T_0$ of FIG. 2. Diode 14 prevents current flow from the capacitor 18 towards the magneto 10 during this period.

As the magneto cycle enters the negative portion thereof, capacitor 18 remains charged and current begins to flow through diode 15 towards magneto 10. The current flowing through diode 15 increases as the negative voltage from magneto 10 increases. The current flowing through diode 15 during the negative portion of the magneto cycle is made up of currents flowing through several parallel circuits comprising the series circuit consisting of capacitor 27 and resistor 28, the circuit consisting of resistor 30 and the circuit consisting of resistors 22 and 24 and potentiometer 23. Resistor 30 has sufficient resistance so that only a very small current flows through it during the negative portion of the magneto cycle and its primary function is to bleed residual charge from capacitor 27 at the end of the negative portion of the magneto cycle as will be more fully explained hereinafter.

The current flowing through the circuit containing capacitor 27 charges capacitor 27, while simultaneously producing a negative voltage pulse at junction 29 as shown by the voltage wave form $V_{29}$ in FIG. 2. As the capacitor 27 becomes charged, current flow in the circuit containing same is reduced and the negative voltage at junction 29 dissipates itself.

The current flowing through resistors 22 and 24 and potentiometer 23 produces a voltage $V_{26}$ at the variable contact arm 26 which varies with time as is shown in FIG. 2. This voltage is positive with respect to the cathode of silicon controlled rectifier 21, and is applied to the control electrode of silicon controlled rectifier 21. When a sufficient voltage is applied to the control electrode, the silicon controlled rectifier is rendered conductive. For purposes of illustration, the silicon controlled rectifier 21 is shown being triggered or rendered conductive at time $T_2$ in FIG. 2. As will be more fully explained hereinafter, the particular instant during the negative portion of the magneto cycle at which silicon controlled rectifier 21 is triggered or rendered conductive can be controlled by adjusting the variable contact arm 26 of potentiometer 23.

When controlled rectifier 21 is rendered conductive, capacitor 27 instantaneously discharges therethrough and a corresponding positive voltage pulse is simultaneously applied through junction 29 to the control electrode of silicon controlled rectifier 17. This voltage pulse renders silicon controlled rectifier 17 conductive and capacitor 18 instantaneously discharges therethrough. A large pulse of current flows through the primary windings of transformer 11 concurrently with, and due to, the instantaneous discharge of capacitor 18 to produce a high voltage pulse in the secondary windings of transformer 11 which is sufficient to generate a spark across the electrode gap of spark plug 12.

Both silicon controlled rectifiers 17 and 21 are returned to their nonconductive state prior to the succeeding positive portion of the magneto cycle. In particular, silicon controlled rectifier 17 is returned to its nonconductive state immediately following the discharge of capacitor 18 when the flow of current therethrough and the voltage on the control electrode thereof is nil. Silicon controlled rectifier 21 is returned to its nonconductive state at the end of the negative portion of the magneto cycle when current ceases to flow therethrough and the voltage on the control electrode thereof has been dissipated.

Diode 15 prevents current from flowing through the parallel circuits connected between diode 15 and ground during the positive portion of the magneto cycle, and diode 14 prevents flow of current between the magneto and the capacitor 18 during the negative portion of the magneto cycle.

Switch 20 as shown in FIG. 1 is conveniently used to stop the internal combustion engine by short circuiting the capacitor 18 transformer 11 to ground. Thus, with switch 20 closed, the current flowing from magneto 10 during the positive portion of the cycle therefrom is shorted to ground and capacitor 18 cannot be charged. This method of killing the ignition is given for purposes of illustration only, as numerous other means for accomplishing the same results can be devised without departing from the scope of this invention.

In the voltage wave form $V_{coil}$ shown in FIG. 2, the dotted curve represents the wave form for the voltage produced by the magneto when unloaded or when disconnected from the circuitry shown in FIG. 1. The solid curve shows the actual voltage from the magneto when it is connected to the circuitry as shown in FIG. 1. During the positive portion of the magneto cycle, current is being drawn from the magneto to charge capacitor 18 and thus the magneto does not develop its full unloaded voltage but only a portion of it. During the negative portion of the magneto cycle, the magneto is shorted out when the silicon controlled rectifier 21 is rendered conductive, and the voltage produced by the magneto abruptly changes from a negative potential to neutral as shown at point $T_2$ in FIG. 2. The magneto remains shorted out until the beginning of the next positive cycle.

The small negative voltage pulse in the voltage curve $V_{18}$ of FIG. 2 is produced by a transient current in the transformer 11 resulting from the instantaneous discharge of capacitor 18, and has only a minimal effect on the system. If anything, this small negative voltage pulse may aid in rendering silicon controlled rectifier 17 nonconductive after the capacitor 18 has discharged therethrough by applying a small reverse voltage to silicon controlled rectifier 17.

As mentioned hereinbefore, the circuitry of this invention provides means of electronically timing the discharge of capacitor 18 for precise regulation of the timing of the spark produced in the spark plug or plugs of the engine. The electronic timing is obtained by adjusting the variable contact arm 26 of potentiometer 23. As the variable contact arm 26 is adjusted to provide less resistance between it and the cathode of silicon controlled rectifier 21, increased current flow through the circuit containing potentiometer 23 and resistors 22 and 24 is required to develop the voltage at the variable contact arm 26 required to trigger the silicon controlled rectifier 21. The current flowing through the circuit containing potentiometer 23 and resistors 22 and 24 increases with time during the negative portion of the magneto cycle, and thus, by adjusting the control arm 26 to provide less resistance between itself and the cathode of silicon controlled rectifier 21, the triggering of the silicon controlled rectifier 21 is delayed to a time later in the negative portion of the magneto cycle when sufficient current is flowing through resistor 22 and potentiometer 23 to produce a sufficient voltage at the variable control arm 26 to trigger silicon controlled rectifier 21. Conversely, by adjusting the variable contact arm 26 to provide more resistance between itself and the cathode of silicon controlled rectifier 21, the voltage required to trigger silicon controlled rectifier 21 is produced with less current flow in potentiometer 23, and thus, the triggering of silicon controlled rectifier occurs earlier in the negative portion of the magneto cycle.

It will be evident that a single potentiometer having the approximate combined resistance of potentiometer 23 and resistors 22 and 24 could be used in place of the resistor 22, potentiometer 23, and resistor 24 as shown in FIG. 1. However, the series connection shown in FIG. 1 has proved to be preferable to a single potentiometer.

As mentioned hereinbefore, resistor 30 as shown in FIG. 1 is used to bleed any residual charge which may build up on capacitor 27 during the latter stage of the negative portion of the magneto cycle following the triggering of silicon controlled rectifier 21. It is possible for silicon controlled rectifier 21 to revert back to its nonconductive state immediately following the discharge of capacitor 27 due to the abrupt drop in current flow therethrough. As explained hereinbefore, the triggering of silicon controlled rectifier 21 occurs during the negative portion of the magneto cycle, and current continues to flow through diode 15 following the triggering of silicon controlled rectifier 21. This flow of current tends to impart additional charge to capacitor 27, especially when the silicon controlled rectifier 21 has reverted to its nonconductive state following the initial discharge of capacitor 27. The circuit through resistor 30 allows any additional charge build up on capacitor 27 to dissipate itself during the positive portion of the magneto cycle prior to the next succeeding negative portion of the magneto cycle.

The circuitry of this invention can be used with a single cylinder, internal combustion engine as depicted in FIG. 1, as well as with internal combustion engines having up to three or four cylinders. In the single cylinder arrangement as shown in FIG. 1, the magneto 10 has at least one pair of magnetic pole pieces positioned on the rotating member thereof. The rotating member of magneto 10 is adapted to be rotated in time with the engine so that the negative portion of the magneto cycle occurs when the piston in the engine is at the end of its compression stroke. The electronic timing of the present circuitry allows precise adjustment of the firing of the spark plug or plugs of the engine.

The rotating member of the magneto 10 can have two pairs of magnetic pole pieces positioned thereon, in which case the magneto can be used in combination with the circuitry of this invention on internal combustion engines having one or two cylinders. In the case of a one-cylinder engine using a magneto having two pairs of magnetic pole pieces, the ignition circuitry would produce a spark in the spark plug at the end of the exhaust stroke as well as at the end of the compression stroke. The spark produced at the end of the exhaust stroke has no effect upon the operation of the engine. In a two-cylinder engine using a magneto having two pairs of magnetic pole pieces, the spark plugs in both cylinders fire at the same time. One cylinder would be on the exhaust stroke and the other on the compression stroke, and the plugs in each cylinder would fire at the end of each of the exhaust strokes and the compression strokes. When the circuitry as shown in FIG. 1 is used with an engine having two spark plugs, a second transformer with its associated spark plug is connected between capacitor 18 and ground either in series or parallel with transformer 11. Alternatively, the second spark plug can be connected to transformer 11 in parallel with spark plug 12. In a three or four cylinder engine, the rotating member of the magneto has three and four pairs of magnetic pole pieces respectively, and three or four transformers, whichever the case may be, are connected between capacitor 18 and ground in parallel.

What we claim is:

1. Circuitry for controlling the transmission of impulse voltages produced by a magneto on an internal combustion engine to a transformer which, in turn, generates a high voltage impulse to produce sparks in the spark plugs of the engine, said circuitry comprising, an input conductor *means* adapted to receive impulse voltages from a magneto;

a first circuit connected to said input conductor [compris] *means comprising* in series a first diode rectifier, a first capacitor and an output conductor, the latter being adapted to be connected to the transformer;

a second circuit connected between said first circuit and ground comprising, a first silicon controlled rectifier having an anode, cathode and a control electrode, with the cathode thereof connected to ground and the anode thereof connected to said first circuit between said first rectifier diode and said first capacitor;

a third circuit comprising, a second diode rectifier and a second silicon controlled rectifier connected in series between said input conductor and ground with the cathode and anode of said second diode rectifier being connected to the input conductor and the cathode of the second silicon controlled rectifier respectively, and the anode of said second silicon controlled rectifier being connected to ground, said second silicon controlled rectifier having a potentiometer shunting the anode and cathode thereof with the variable contact arm of said potentiometer being connected to the control electrode of said second silicon controlled rectifier, said third circuit also including a second capacitor and a resistor connected in series between the cathode of said second silicon controlled rectifier and ground, with the control electrode of said first silicon controlled rectifier being connected to said third circuit at a point therein intermediate between said second capacitor and said resistor.

2. Circuitry as claimed in claim 1 wherein said second silicon controlled rectifier is shunted by a series connection comprising a resistor, a potentiometer and another resistor.

3. Circuitry as claimed in claim 1 wherein a resistor shunts said second capacitor and resistor of said third circuit.

4. Circuitry as claimed in claim 1 in combination with an internal combustion engine having a magneto, transformer, and at least one spark plug.

5. Circuitry as claimed in claim 4 wherein a normally open switch is connected between a point intermediate between said first diode and said first capacitor and ground for stopping the engine.

6. Circuitry as claimed in claim 1 in combination with an internal combustion engine having a magneto, a transformer and from one to four cylinders with a spark plug for each cylinder.

7. The combination as claimed in claim 6 wherein the internal combustion engine has one cylinder.

8. The combination [is] *as* claimed in claim 6 wherein the internal combustion engine has two cylinders.

9. The combination as claimed in claim 1 wherein the internal combustion engine has three cylinders.

*10. Circuitry for controlling the transmission of impulse voltages produced by magneto means on an internal combustion engine to a transformer which, in turn, generates a high voltage impulse to produce sparks in the spark plugs of the engine, said circuitry comprising,*

*input conductor means adapted to receive impulse voltages from a magneto;*

*a first circuit connected to said input conductor means comprising in series a first diode rectifier, a first capacitor and an output conductor, the latter being adapted to be connected to the transformer;*

*a second circuit connected between said first circuit and ground comprising, a first silicon controlled rectifier having an anode, cathode and a control electrode, with the cathode thereof connected to ground and the anode thereof connected to said first circuit between said first rectifier diode and said first capacitor;*

*a third circuit comprising, a second diode rectifier and a second silicon controlled rectifier connected in series between said input conductor means and ground with the cathode and anode of said second diode rectifier being connected to the input conductor means and the cathode of the second silicon controlled rectifier respectively, and the anode of said second silicon controlled rectifier being connected to ground, said third circuit also including a second capacitor and a resistor connected in series between the cathode of said second silicon controlled rectifier and ground, with the control electrode of said first silicon controlled rectifier being connected to said third circuit at a point therein intermediate between said second capacitor and said resistor; and*

*means in conjunction with said magneto means for applying controlled input voltages to the control electrode of said second silicon controlled rectifier.*

* * * * *